(12) United States Patent
Beadle

(10) Patent No.: US 7,499,515 B1
(45) Date of Patent: Mar. 3, 2009

(54) SYSTEM AND METHOD FOR AUTOMATED LINK QUALITY MEASUREMENT FOR ADAPTIVE MODULATION SYSTEMS USING NOISE LEVEL ESTIMATES

(75) Inventor: Edward R. Beadle, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/845,160

(22) Filed: Aug. 27, 2007

(51) Int. Cl.
H04L 7/00 (2006.01)
H04L 23/00 (2006.01)

(52) U.S. Cl. ...................................... 375/358; 375/377

(58) Field of Classification Search ................. 375/295, 375/316, 340, 377, 140, 343, 362–368; 370/504–515
See application file for complete search history.

(56) References Cited

U.S. PATENT DOCUMENTS

| | | | |
|---|---|---|---|
| 5,694,388 A * | 12/1997 | Sawahashi et al. | 370/206 |
| 5,757,845 A * | 5/1998 | Fukawa et al. | 375/152 |
| 6,567,462 B1 | 5/2003 | Brunner et al. | 375/148 |
| 6,711,528 B2 | 3/2004 | Dishman et al. | 702/189 |
| 6,941,123 B2 * | 9/2005 | Choi et al. | 455/273 |
| 6,993,460 B2 | 1/2006 | Beadle et al. | 702/196 |
| 7,062,277 B2 | 6/2006 | Rudowicz | 455/452.1 |
| 7,076,001 B2 | 7/2006 | Beadle et al. | 375/316 |
| 7,187,326 B2 | 3/2007 | Beadle et al. | 342/451 |
| 2002/0039887 A1 * | 4/2002 | Delabbaye et al. | 455/42 |
| 2004/0120411 A1 * | 6/2004 | Walton et al. | 375/260 |
| 2004/0204922 A1 * | 10/2004 | Beadle et al. | 702/189 |
| 2006/0269017 A1 * | 11/2006 | Beadle et al. | 375/343 |
| 2006/0269027 A1 | 11/2006 | Beadle et al. | 375/354 |
| 2007/0291868 A1 * | 12/2007 | Olesen et al. | 375/267 |

OTHER PUBLICATIONS

Chang et al., "*A Matrix-Pencil Approach to Blind Separation of Colored Nonstationary Signals*," IEEE Transactions on Signal Processing, vol. 48, No. 3, Mar. 2000, pp. 900-907.

Parra et al., "*Blind Source Separation via Generalized Eigenvalue Decomposition*," Journal of Machine Learning Research 4 (2003), pp. 1261-1269.

Steven M. Kay, Modern Spectral Estimation: Theory and Application, Prentice Hall, Jan. 1988, Section 13.9—Noise Subspace Frequency Estimation, pp. 429-431.

(Continued)

Primary Examiner—Tesfaldet Bocure
(74) Attorney, Agent, or Firm—Allen, Dyer, Doppelt, Milbrath & Gilchrist, P.A.

(57) ABSTRACT

A communications system includes a transmitter that transmits a modulated signal having encoded communications data over a communications channel. The transmitter adjusts one of at least modulation and coding at the transmitter based on the received channel state information of the transmitted signal. A receiver determines received signal metrics from the modulated signal. A noise power estimator estimates the noise power of the received communications signal by collecting N data samples from the communications signals, forming a covariance matrix of the N data samples based on a model order estimate, computing the eigenvalue decomposition of the covariance matrix and ranking resultant eigenvalues from the minimum to the maximum for determining the noise power of the received signal. At least one of modulation and coding are adjusted based on the monitored link quality of the communications channel to enhance use of the available channel capacity.

18 Claims, 8 Drawing Sheets

OTHER PUBLICATIONS

Dan et al., "*On the Blind SNR Estimation for IF Signals*," Proceedings of the First International Conference on Innovative Computing, Information and Control, IEEE, 2006, 4 pages.

Pauluzzi et al., "*A Comparison of SNR Estimation Techniques for the AWGN Channel*," IEEE Transactions on Communications, vol. 48, No. 10, Oct. 2000, pp. 1681-1691.

Lee et al., "*Joint Estimation of the Space-Time Distributed Signal Parameters*," IEEE, Vehicular Technology Conference (VTC) 2000, pp. 822-828.

Benedict et al., "*The Joint Estimation of Signal and Noise from the Sum Envelope*," IEEE Transactions on Information Theory, vol. IT-13, No. 3, Jul. 1967, pp. 447-454.

Beaulieu et al., "*Comparison of Four SNR Estimators for QPSK Modulations*," IEEE Communications Letters, vol. 4, No. 2, Feb. 2000, pp. 43-45.

Celandroni et al., "*Quality Estimation of PSK Modulated Signals*," IEEE Communications Magazine, Jul. 1997, pp. 50-55.

Matzner, "*An SNR Estimation Algorithm for Complex Baseband Signals Using Higher Order Statistics*," Electronics and Energetics, vol. 6, No. 1, 1993, pp. 41-52.

* cited by examiner

SYSTEM AND METHOD FOR AUTOMATED LINK QUALITY MEASUREMENT FOR ADAPTIVE MODULATION SYSTEMS USING NOISE LEVEL ESTIMATES

FIELD OF THE INVENTION

The present invention relates to communications, and more particularly, this invention relates to communications in a multi-signal environment in which noise levels are blindly estimated and the estimates can be used in adaptive modulation systems.

BACKGROUND OF THE INVENTION

Commonly assigned and co-pending U.S. published patent application no. 2006/0269027, the disclosure which is hereby incorporated by reference in its entirety, discloses a receiver that includes a matched filter and an M-of-N detector coupled to the matched filter output. The detector is employed to determine potential synchronization pulses occurring at least M times in N consecutive opportunities. The essential element of the co-pending application relevant to this application is that of the on-line noise estimation process for the constant false alarm rate (CFAR) detector. The previously disclosed noise estimator in U.S. Patent Publication No. 2006/0269027 used an outlier rejection scheme to delete samples from a data record that likely contained significant non-noise components. This approach can work well when the receiver can rely on a relatively large difference between samples that are noise-only and those that contain 1 or more signal components (e.g., high signal-to-noise (SNR) scenarios). However, the proposed method does have some shortcomings. For example, if the significant portions of data record collected are "contaminated" with signal, then the previous technique is unable to recover the noise processes for the purpose of noise power estimation to support the CFAR detection scheme.

New improvements are necessary. For example, in this disclosure, a posture of adopting "blind" signal processing is used (where blind means that the signals and noise are "unlabeled" to the receiver). Additionally, only a scalar (i.e., non-array) system is assumed. This means that traditional array processing techniques (e.g., beam-forming and nulling) are not applicable to aid in noise estimation. Lastly, the processing for noise power estimation is performed on-line or as an in-service estimator. The value of this property is well appreciated by those skilled in the art, but in short it means that the link need not reserve any specialized resources solely for aiding the signal receiving to estimate the noise processes needed for setting optimum receiver or link performance.

Assuming that the link noise can be blindly estimated in an in-service or on-line manner, then this estimate could be used to improve communication system efficiency or throughput by not only enabling adaptive modulation, but also for improving some blind source signal separation methods allowing by say allowing N sources to be separated by N sensors employing only second-order statistics, and blind adaptive thresholding for robust signal detection with various quality indicators in the presence of multiple interfering signals.

SUMMARY OF THE INVENTION

The system disclosed is an adaptive modulation communication system that includes a blind in-service noise estimator and includes a "signal" power estimator and link resource allocator. The transmitter and receiver stations exchange configuration data via control channels, which are separated in some manner from the data channels. The data channel is typically scalar (i.e., non-array based) but can apply to multi-signal and multi-user applications. Signal and noise estimates can be operatively used to enable waveform selection in the transmitter to "optimally" use the available channel capacity and resources to adapt to changing channel conditions.

The system transmitter includes a link resource allocator that adjusts one of several aspects of communications link usage, such as modulation format, coding type, data rate, at the transmitter based on the received channel state information (CSI) of the transmitted signal. A receiver receives transmitted signal, and includes a demodulator that determines received signal metrics from the modulated signal. An in-situ or online noise power estimator estimates the noise power of the received communications signal by collecting N data samples from the communications signals. The method employed is preferred to use a decomposition of a data-based covariance matrix of N data samples (see co-pending U.S. published patent application no. 2006/0269027). The value of N is primarily based on some characteristics, such as the number of carriers p occupying the channel, supplied to the reception system via the forward control channel. The receiver thus uses some transmitter configuration data to properly configure a model order estimate for developing a covariance matrix and computing the eigenvalue decomposition of the covariance matrix. Additional processing is performed on the resulting eigenvalues to achieve a robust estimate of the background noise corrupting the communication channel. The processing can be summarized as size rank the eigenvalues from the minimum to the maximum for determining and average a selected set of the smallest eigenvalues to derive an estimate of the noise power of the received signal.

A link quality generator in the receiver then using signal metrics, such as total average power and the noise-only power estimates to form a metric useful (e.g. SNR) for a transmitter to select waveforms appropriate for maximal channel usage. The SNR is a primary indicator the link quality of the communications channel and generates the key metric of channel state information (CSI) needed in the transmitter. The receiver SNR is communicated to the transmitting station via a reverse control channel.

In the transmitter, the received signal metrics are used by a link resource allocator within the transmitter. Under a prescribed set of rules, the link resource allocator will instruct the modulation system in the transmitter on the waveform characteristics to employ to best meet the data transfer demands pending using the communications channel.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
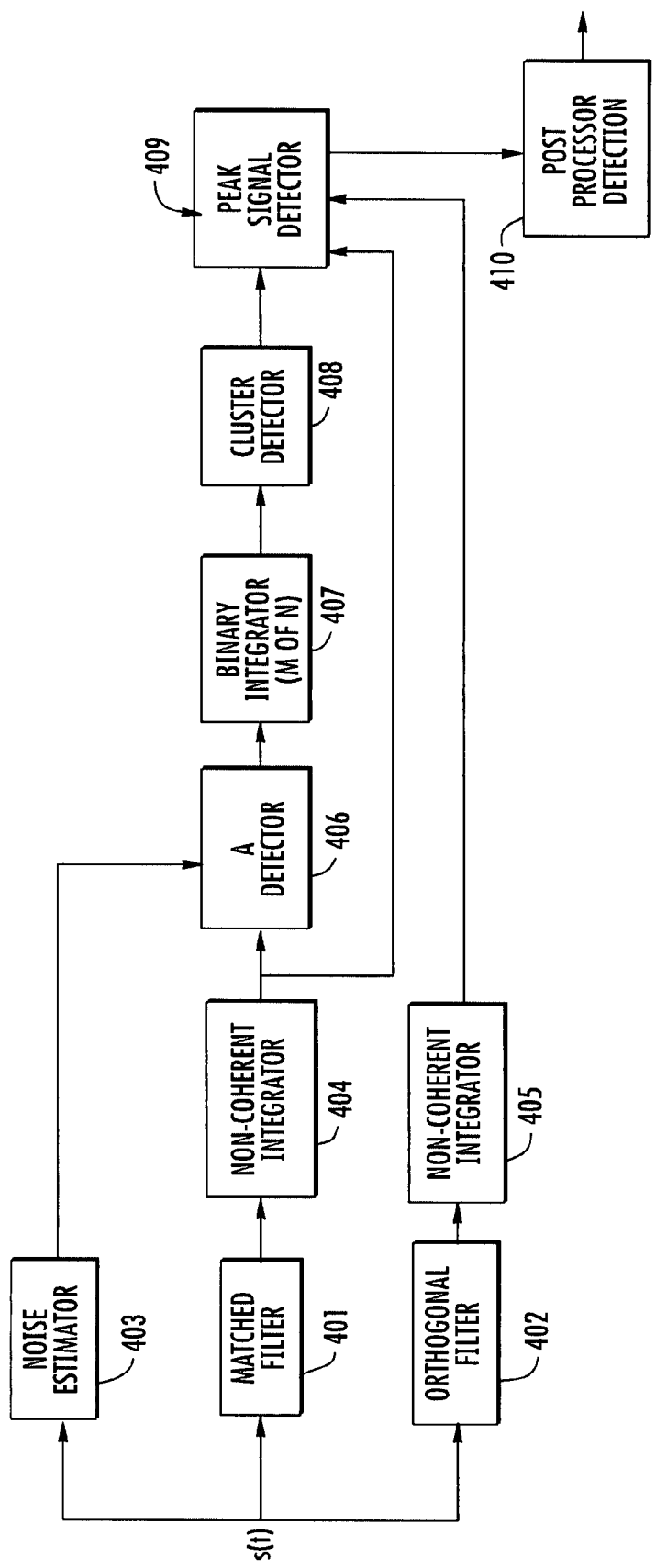
FIG. 1 is a functional block diagram of the architecture of a receiver having a CFAR detector such as could be adapted for use in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited to any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Attention is now directed to FIG. 1, which is a functional block diagram of the architecture of the CFAR detector disclosed in the above-referenced and incorporated by reference patent application. For purposes of description, the terms CFAR filter and detector are used interchangeably. The CFAR filter reduces (optimally minimizes) the probability of false alarms (PFA), while making the probability of detection (PD) of the desired signal as high as possible (thus maximizing the probability of detection) while being robust to changes in operating conditions. To this end, the CFAR process employs a noise estimator to adaptively program the signal detection threshold given the data collected. As previously disclosed, the key to any CFAR process is generating an accurate estimate of the noise-only variance.

The input of the CFAR filter, to which an incoming (received) signal s(t) is applied from the receiver terminal's front end, is coupled in parallel to each of a (sync pulse shape-conforming) matched filter 401, an (inverse sync pulse shape-conforming) orthogonal filter 402 and a noise power estimator 403. In an ideal (i.e., noiseless) case, at the exact time that (sync pulse) matched filter 401 provides a maximum output, the orthogonal filter 402 provides a zero output. The orthogonal filter 402 thus provides a mechanism for determining the center and time-of-arrival of a received sync pulse. The detection of sync pulses is based upon the peak difference between the output signals of the respective filters 401 and 402, as carried out by a peak detector 409, to which the outputs of filters 401 and 402, and the output of a cluster detector 408 are coupled.

The output of the matched filter 401 is coupled to an associated non-coherent integrator 404, while the output of orthogonal filter 402 is coupled to an associated non-coherent integrator 405. Each integrator derives a running summation of instantaneous power and provides a discrete time equivalent of integration, and accumulates the total energy on a per time hypothesis basis within a prescribed pseudo-observation interval. The output of the non-coherent integrator 404 is coupled to a CFAR detector 406 that determines whether the output of the non-coherent integrator 404 constitutes signal plus noise or noise only. The CFAR detector 406 collects the potential times-of-arrival of a plurality of sync pulse samples and reduces the number of potential sync pulse detections by comparing the signal samples with a noise power only-based threshold. Samples whose energy does not exceed the CFAR threshold are discarded. Thus, the CFAR detector 406 suppresses random noise events.

Deriving a measure of noise-only variance requires an estimation operation, which, for in-service estimators are ideally carried out in the presence of the signal to be detected. Because, as those skilled in the art recognize, it is highly desirable to avoid committing any link resources (e.g., link capacity, energy, computational cycles, etc.) solely for aiding the receiver to estimate the background noise. Hence the information bearing signals (and possibly interfering signals) are always present. To avoid performance degradation that can result from the influence of signals other than noise in the estimation process, the noise power estimator 403 operates as an outlier detector and effectively removes from the noise power estimation process any "signal" plus noise samples that exceed a prescribed data dependent noise floor or threshold. However, this approach requires a certain number of noise-only samples be available, hence this approach is mainly applicable to pulsed communication systems (e.g., on-off keyed signals). Systems where the information bearing signal(s) are continuously operating will cause difficulties with the previously disclosed noise estimator. The output of the noise power estimator 403 is a threshold $\gamma_t$ that may be defined as follows:

$$\gamma_t = \sum_{i=1}^{N_P} \left( m_1 + \frac{k_T(P_{FA})}{\sqrt{N_P}} \sigma_1 \right) \hat{P}_i \quad (1)$$

In this equation, $\hat{P}_i$ is the estimated noise power and scales the expression in parenthesis, $k_T$ is computed from a polynomial and the CFAR threshold $\gamma_t$ can be pre-computed and stored in a table of values.

The output of the CFAR detector 406 is coupled to a cascaded arrangement of a binary integrator 407 and cluster detector 408, which effectively perform sidelobe and data hop (i.e. bursty data signal) rejection. The binary integrator 407 removes additional random events, including any large interference pulse signal events and data pulses, while the cluster detector 408 determines whether the received input is "too narrow" or "too wide" to be a valid sync pulse. The output of the cluster detector 408 is coupled to a peak detector 409, which is also coupled to receive the outputs of non-coherent integrators 404 and 405, as described above. The detector 409 locates the point where the signal difference between the integrated output of matched filter 401 and the integrated output of orthogonal filter 402 is maximum. The output of the peak detector 409 represents a valid sync pulse and constitutes the input to a downstream signal processor 410.

The value of the threshold used by the CFAR filter to exclude false alarms selectively is adaptively adjusted on a block-block basis.

As will be appreciated from the foregoing description, the probability of detecting false alarms in operating conditions where intentional or un-intentional information bearing signals are continuously operating complicates the CFAR detection princples previously disclosed. It should be understood that the noise estimator and process can be improved.

I. Blind In-Service Noise Level Estimator

In accordance with the non-limiting example of the present invention, a blind CFAR noise estimator provides an in-service estimator for a scalar channel with a (possibly) multi-signal environment. The blind noise estimator enables a detection threshold to be set to meet the probability of detection and false alarm rate. The noise estimate is derived from a decomposition of a temporal correlation matrix of a certain minimum size. The signal contamination issue is avoided because of the size of the matrix that is used.

Figure 2:
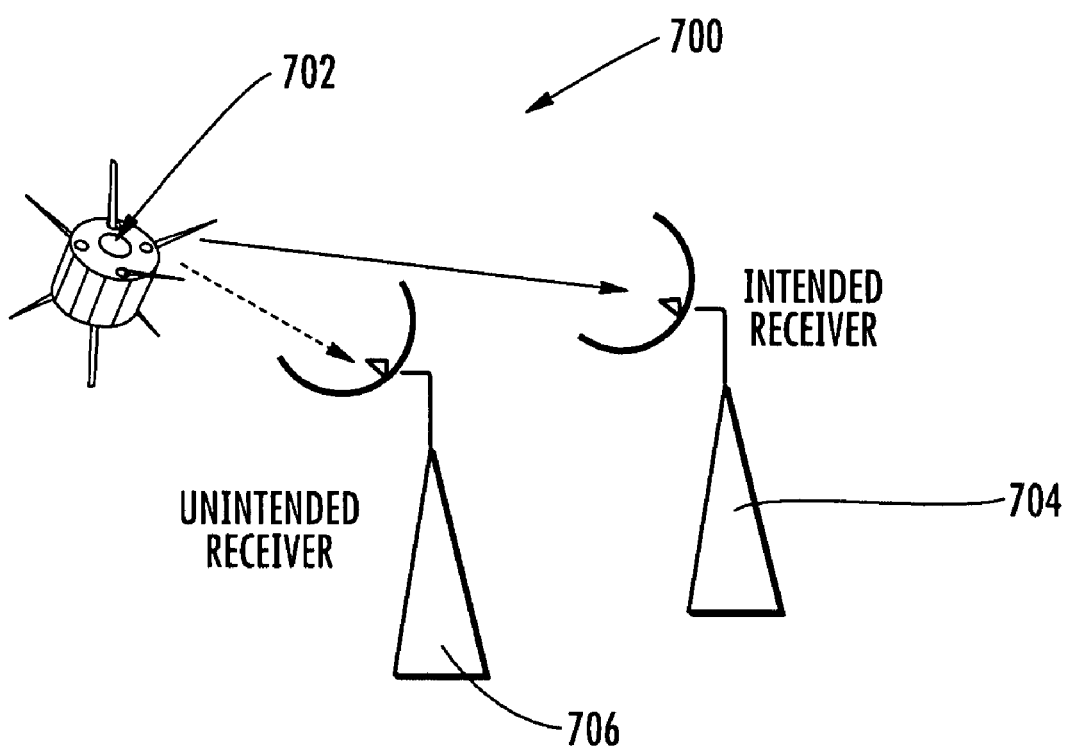
FIG. 2 diagrammatically illustrates two receivers, one as an unintended receiver and one as an intended receiver, and a satellite for communicating therewith, and illustrating a scenario associated with a low and constant false alarm rate and a "disadvantaged" signal-to-noise ratio.

FIG. 2 is a fragmentary, environmental view of a communications system 700 showing a satellite 702 that communicates with an intended receiver 704 and an unintended receiver 706. Using the communications system and circuits shown in FIG. 1, it is desirable to have a low and constant false alarm rate (pfa), but that requires some knowledge of the "in situ" noise floor. Further, there is a possibly "disadvantaged" signal-to-noise ratio (SNR) in 706, which implies that a precise threshold (i.e., accurate estimate of noise floor) is required to avoid false alarms. Numerous false alarms can have the negative effect of "clogging" or "draining" radio processing resources co-located with 706.

Typically, the signal environment is unknown and time-varying between the transmitter platform 702 and the receivers 704 and 706. Hence provisions to adapt to changing or unpredictable conditions are included. Further, as noted previously, the signals emitted from 702 are not "cooperatively blanked," and do not provide a priori known features, such as training sequences and preambles. This last fact when coupled with possible un-coordinated co-channel interference combine to create a potential for a greatly overloaded application in a multi-signal environment, particularly when the receive systems are not array-based.

As a result the problem becomes one associated with an antenna element in a multi-signal environment. This problem is solved by the "blind" noise estimator such as the example shown with the circuit in FIG. 3, in accordance with a non-limiting example of the present invention and incorporated within the noise power estimator of FIG. 1.

Figure 3:
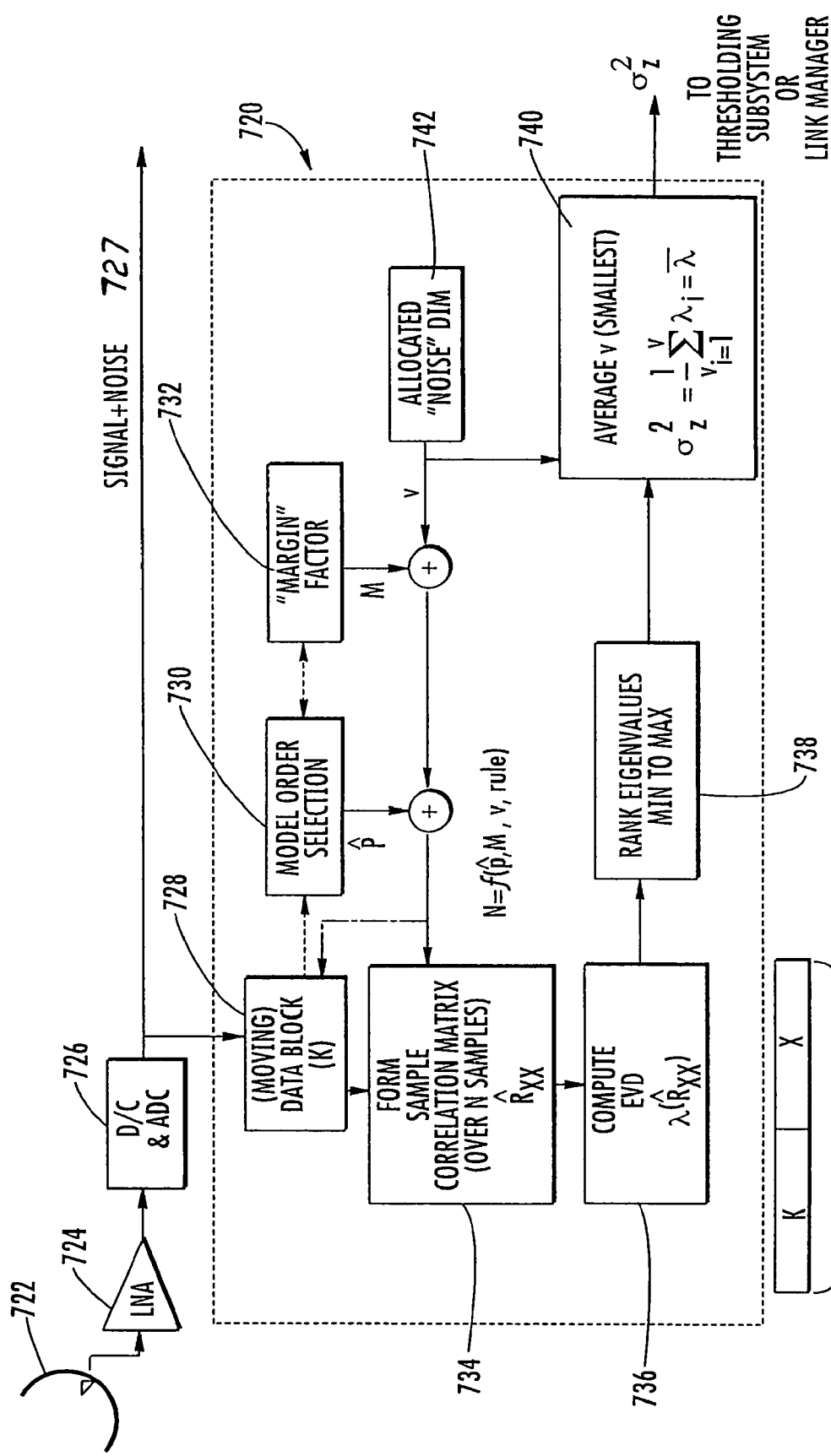
FIG. 3 is a block diagram of a noise estimator circuit that can be incorporated in the CFAR detector shown in FIG. 1 and operative for a blind noise estimation in a communications channel in accordance with a non-limiting example of the present invention.

FIG. 3 is a block diagram illustrating at 720 the noise estimator in accordance with a non-limiting example of the present invention and showing circuit components operable on a data sample, for example, 10 microseconds of data per block.

The receiver antenna 722 is typically connected to a low noise amplifier (LNA) 724 for the purpose of low-level signal amplification of the radio-frequency (RF) signal. Following the typical RF reception circuitry is the down-converter (D/C) and analog-to-digital converter (ADC) notated as 726. The down-converter contains the circuitry typical of that to frequency shift, amplify and filter a band of frequencies for proper digitization as is well known to those skilled in the art. The analog/digital converter 726 operates at an appropriate intermediate frequency (IF) input frequency in typical non-limiting examples and has appropriate bit resolution for the system under consideration.

The output of the data-converter is labeled as "signal and noise" 727. This signal is processed by the noise estimation block 720 is detailed in FIG. 3. As shown in FIG. 3, a sequence of N digitizer outputs (i.e., ADC) is blocked into two consecutive blocks, respectively of size K and size X such that K+X=N. Successive blocks of N data samples may be defined from no overlap to nearly complete overlap depending on the specific application and designers discretion. While it is the intention to perform the processing described below on contiguous blocks of N sample, it is also conceivable that a system designer may wish to conserve processing resources and hence "sparsely" estimate the noise background. In this case the blocks of N samples may be taken somewhat "at will" and collected at scheduled or random intervals according to some application dependent rule.

Provision is also allowed for the data blocks to be of non-uniform size. Since as the system explores the signal environment it is reasonable to expect that N could be block adaptive. Smaller N allows faster adaptation to changing environments and limits computation resources. Larger N improves the accuracy of the correlation matrix entries. The designer must balance the trade-space for successful individual applications.

Returning the data collection, a block of K samples is taken in sequence as a (moving) data block (K) 728, for example, K=100 or more samples. Another block of data samples will be taken, X, forming an N sample block. The K blocks can be treated as a training sample for a model order selection module 730 and "margin" factor module 732. The model order, $p_{est}$, is selected at the module 730. The accuracy of the value $p_{est}$ is based on several factors, including the model order estimation rule chosen, expected SNR, signal types expected, how many signals may be expected, computational resources to allocate to the problem to name a few.

Acknowledging that model order selection is an estimation process, and as such, subject to a variety of statistical variation issues, a "margin factor" M is generated within module 732. Factors contributing to the selection of an appropriate "margin factor" are similar to those listed above. The "margin factor" M is added to the estimated model order to insure that the correlation matrix formed in 734 is of sufficient size to capture the signal+noise space, so that appending v columns is guaranteed to access the noise-only space. Equivalently the "margin factor" M is selected to insure the condition, $M+p_{est}-1>p$. Also, M can be used to include a margin for multipath, intermodulations and harmonic components not captured in the true model order "p".

The sample correlation (or covariance matrix Rxx) of the N data samples based on the model order selection using single channel data is calculated within the processor 734 using typical estimation methods. This matrix Rxx is a temporal covariance matrix of the N samples of data. A module 736, computes the usual eigenvalue decomposition of the correlation matrix. The eigenvalues are ranked (by size) from minimum to maximum value within a comparator module 738. In block 740 the smallest v eigenvalues are taken and allocated as a dimensions representative of the noise-only space in covariance matrix Rxx. This allocation is based on the pre-allocated "noise" dimension v from module 742. It should be understood that the covariance matrix dimension used in this processing is typically large, but is much less than the number of data samples (N). Hence we are not computing a full covariance matrix that could be calculated given the totality of data collected (i.e. N samples). The covariance matrix computed is intended to be the smallest possible size consistent with providing the access to the noise estimates.

Figure 4:
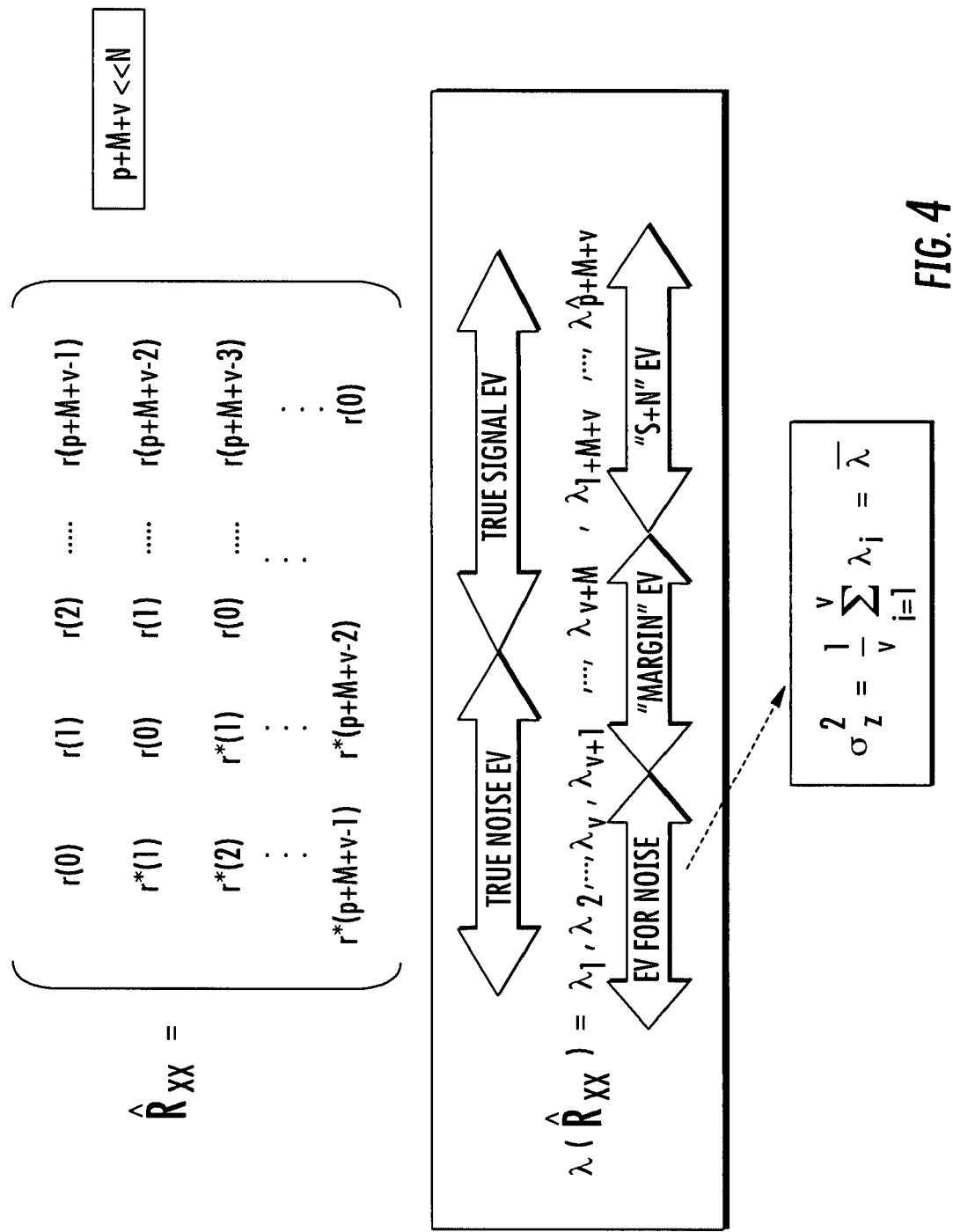
FIG. 4 illustrates a covariance matrix of N data samples based on a the result of model order p, margin M, and reserved noise dimension v selection using single channel data. The eigenvalue ranking by size is also illustrated along with a sample labeling of the eigenvalues as estimated and with ground truth.

Returning to the eigenvalues of the correlation matrix, we point out that the trend that largest eigenvalues are representative of the true signals and the smallest eigenvalues are representative of the noise-only. The "v" smallest eigenvalues shown are in the noise dimension. As shown in the example covariance matrix Rxx and related calculations of FIG. 4, the v smallest eigenvalues are the desired eigenvalues for noise estimation. In principle v could be selected as small as 1, but experience has shown that due to statistical and numeric effects selecting v approximately equal to 3 produces good results and is robust over a variety of operating conditions.

The circuit as described for the noise estimator 720 forms an estimate of the noise floor (or total noise) in a band-of-interest while "contaminating" signals are (possibly) present. In this band-of-interest, there are an unknown, but bounded, number of communications signals, all of which may have unknown parameters (e.g., power, polarization, phase, etc.). The signals may also all have an individually set power. Usually, there is typically only a single temporal record of single channel data, i.e., the system is not considered an array processing problem, and instead is considered a blind noise estimation problem. The signals can be assumed to be stationary to at least a second order, i.e., WSS (wide-sense stationary) signals.

Depending on the signal models assumed to comprise the signal environment, numerous techniques for model order selection may be chosen. For example, suppose the technique Pisarenko Harmonic Decomposition (PHD) is chosen. This typically means that the system designer is willing to model the signal set as a set of sinusoids in white noise. For example, the data generation model could appear as:

$$x[n] = \sum_{i=1}^{p} \sqrt{\frac{P_i}{2}} \exp(j2\pi f_i n) + z[n]$$

where z[n] is complex Gaussian noise of zero mean and variance one (1), and the $P_i$ sets the power of each of the p complex sinusoids.

The estimation system block 720 (FIG. 3) may not known p a-priori, but when the estimation system processes the digitized data to achieve the noise estimate, however, this is not critical. Recall that the addition of the noise dimension v and margin M should allow "access" to noise only dimensions in the correlation matrix.

The processing system block 720 exploits the fact that it can form the sample temporal covariance matrix Rxx of suitable dimension $(M+p_{est}+v)$ by $(M+p_{est}+v)$ so that there are at least v eigenvalues (in principle) equal to the noise power.

In practice, there is a small spread of noise eigenvalues but this can be (at least partly) controlled by the data record length. Longer records, increased N, should improve the clustering of the noise eigenvalues. Also, assuming the system has a reasonable signal-to-noise ratio (SNR) (typically 3-6 dB), the noise eigenvalues should be fairly easily identified as the signal+noise space eigenvalues will be somewhat larger. Typically the larger the signal-to-noise ratio, the greater the distance. So, in applications with higher SNR, even some of the "margin factor" eigenvalues may be parsed into the noise dimension if desirable.

There now follows a sequence of steps that can be used for estimating the noise power in accordance with a non-limiting example of the present invention. Of course, different steps and intervening steps could be used, but the following illustration gives an overall methodology that could be modified or expanded as necessary.

Step 1. Estimate Model order. Any model order estimation procedure could possibly be used to obtain an estimated model order and call it $p_{est}$. Possible procedures include, but are not limited to, PHD, MUSIC, AR modeling, MDL, BIC, AIC or others.

Step 2. Form Sample Rxx (not full covariance matrix. The system typically requires a few extra columns more than the number of expected signals. The system selects "extra dimensions" (namely M and v). M, as mentioned above is selected to overbound the estimated model order, and v is selected to guarantee a certain number of noise-only dimensions. Good performance has been obtained with v=3 (assuming that p was well estimated). A limiting factor on selecting v is how many "similar" eigenvalues the system requires to be sure it has a repeated value different from the signal+noise space values. It is also desirable to limit v (and the "margin" M) to limit the computations required, since the system will require an full eigenvalue decomposition of larger and larger matrices as M, $p_{est}$ and v grow.

If the model order estimation technique is known or suspected to be biased low, the system designer will add some safety margin (in terms of extra "buffer" columns in the correlation matrix) and increase the size of the matrix Rxx. This is to insure separation of the p signal+noise and v noise-only eigenvalues. For example, the system can choose the dimension of Rxx as:

Dim=$p_{est}$+abs("maximum model order bias")+v

Step 3. Compute Eigen Decomposition of Rxx. Compute the "traditional" Eigen decomposition of the matrix Rxx.

Step 4. Parse the Set of Eigenvalues into Noise-Only and Non-Noise Only Spaces. The system starts with the smallest value. This may be close enough to the noise floor value to provide meaningful results in the applications. However, as a non-limiting example, a better approach is to use the v smallest Eigenvalues say by averaging them. Averaging will tend to reduce the variance of the noise estimate from selecting a single eigenvalue. Also, many other methods of processing a collection of statistics to refine a point estimate exists as well, such as using the median of the v smallest values. No one method is preferable in all cases.

Also, if still further refinement in the noise estimate, one could use more than the v smallest eigenvalues but then issues regarding where to "cut off" arise because there are $p_{est}$ signals there is an added safety margin.

Optional Step 5. The system can increase the parameter v, and repeat the process to determine if a minimum Eigenvalue has remained about the same. This is simple without much added computation, since the system adds a single row and column to the already computed Rxx from the previous step. Hence, it is almost recursive.

For a two signal case (f=0.25 Fs, and 0.35 Fs, Fs is the ADC sampling frequency) with a signal-to-noise ratio of about 6 dB each and 1000 samples, the system in simulation obtained:

| | |
|---|---|
| v = 1, λ = 0.989, 1.8060, 12.216 | Noise power is 1.0 |
| v = 2, λ = 0.9645, 1.0549, 2.8632, 14.82 | Noise power = 1.0 (mean of 2 smallest values is 1.0097) |
| v = 3, λ = 0.885, 1.030, 1.099, 4.685, 18.226 | Noise power = 1.0 (mean of 3 smallest values is 1.0048) |

In one non-limiting example, the model order selection (as an estimate) can be based on use of a database of methods to operate on the data. Meaning that there can be a number of rules available "on demand" to select and refine the model order. The preferred embodiment uses data-based model order selection so the primary candidates of interest to most designers will be Multiple Signal Classifier (MUSIC) algorithm, Pisarenko Harmonic Decomposition (PHD), AIC, BIC, or MDL. Many other techniques known in engineering literature could be used. Data-based systems are preferred as they enable the system to adapt to changing signal environment conditions.

There are also non-data based methods such as simply selecting a "reasonable large number" to overbound the maximum number of possible individual signals on a transmitter but this is less attractive as the computations and data collection requirements will be fixed by a worst-case scenario which may infrequently, if ever, occur.

Figure 5:
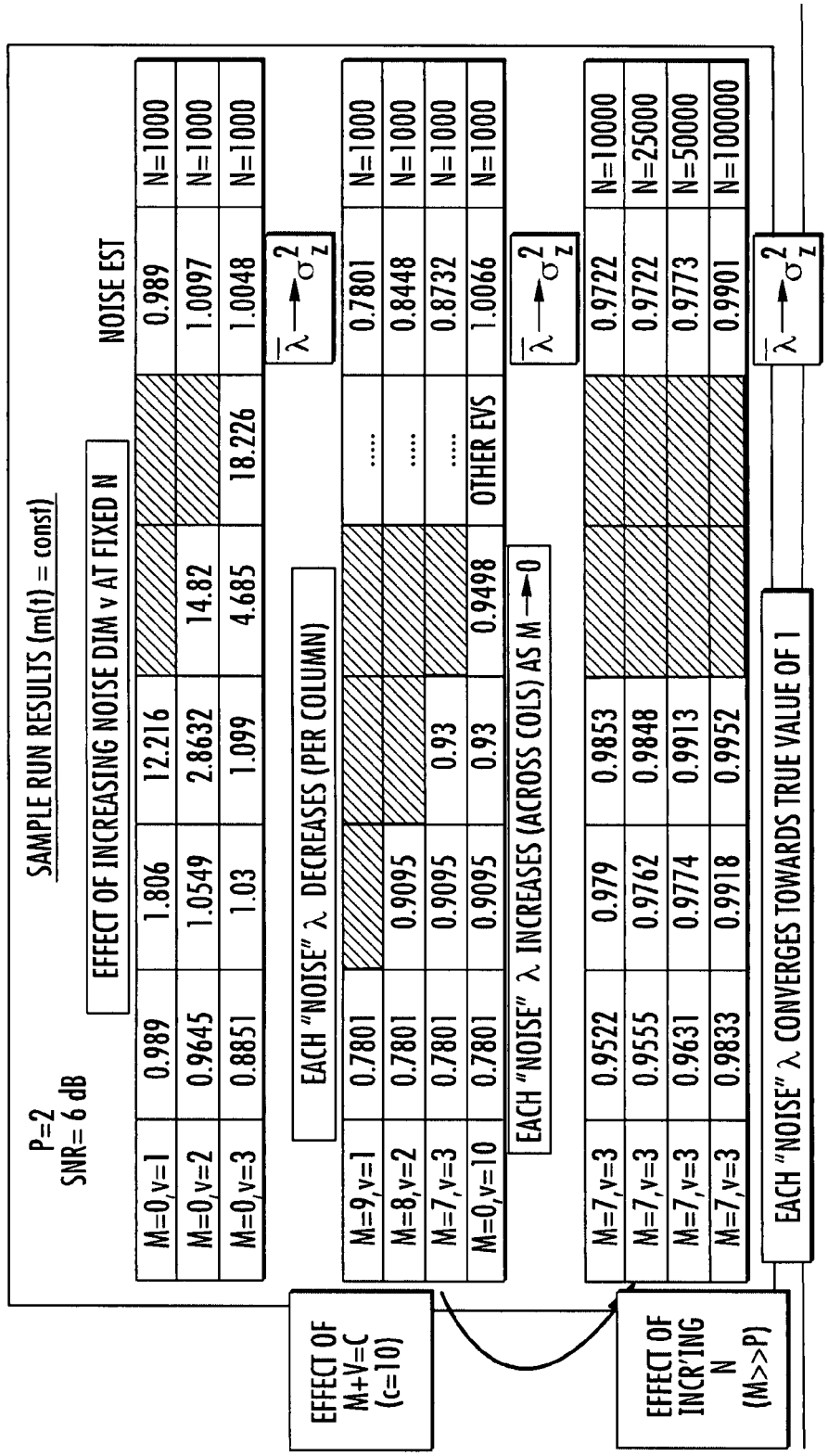
FIG. 5 is a table showing sample run results and associated calculations in accordance with a non-limiting example of the present invention.

FIG. 5 is a table showing sample results. The columns 2-6 in the chart are the eigenvalues of the correlation matrix ranked in size order. The top block of data in the table shows an effect of the increase in the noise dimension "v" in the matrix at fixed N with two signals as "p" (and "margin" M=0) and a signal-to-noise ratio of 6 dB. The noise dimension is increased to 1, 2 and 3 with p fixed at 2, M=0, and N is 1000 samples. In this case, we assumed a clairvoyant model order estimate (p=$p_{est}$) to illustrate the effects of v. It is evident that as v is increased the average of the noise eigenvalues is getting closer and closer to the desired value (i.e., unity) of the truth in the simulation.

The second or middle part of the table shows the noise margin and subspace using two signals and sum of the "margin" M and noise dimension v are equal to 10. The margin decreases and noise dimension increases down the rows. In columns 2-5 the smallest v eigenvalues are shown (up to 4). Column 7 shows that the noise estimate from using the average of all v eigenvalues (some of which are not shown on the table for space reasons). In the case as v is increased the noise estimate (column 7) is highly accurate. However, in case of v=3 suitable accuracy for many application has been achieved. This table limited the data collection to N=1000 samples. Since the performance with v=3 is good for most practical situations a third table was generated hold M and v constant and increasing the number of samples per block.

The third or lower part of the table shows the effect of increasing N with M fixed at 7 and v=3. Note that as compared to the middle chart increasing N to at least 10000 samples has improved the noise estimate using v=3 smallest eigenvalues to nearly the ideal value of unity (with reference to row 3 of the middle table, labeled with M=7, v=3). Further increases of N provide only marginal improvements, and come at a cost of greatly increased processing to develop the sample estimates.

A result of the testing indicates that for "low" SNR (e.g. 3-6 dB) applications v should be set to nominally 3, N can be selected about 10000, and M can be safely selected nearly 4 times the expected true model order p.

The embodiments, in accordance with a non-limiting example of the present invention, allow the environment to vary and adapt to changes even at a low signal-to-noise ratio, while using a low dimension Rxx. As will be explained below, the noise estimator can be coupled to an adaptive modulation system. The system uses the noise estimate in conjunction with a threshold computation to provide an adaptive CFAR detection capability even in high multipath. This "blind" CFAR system operates without knowledge of the signal environment, multipath environment, noise environment or sensing antenna system in the presence of signals. Many traditional CFAR techniques, e.g., radar systems, assume the absence of the "target". Other CFAR systems exploit waveform properties, e.g., the orthogonality, to operate without an array to isolate noise from multiple signals. The system in accordance with non-limiting examples of the invention can operate at low SNR 3 to about 6 dB (or even less) range with an adaptive data buffer size "N" to support various adaptation rates.

II. Automated Link Quality Metric Measurement for Adaptive Modulation Systems Using the Blind In-Service Noise Level Estimator In accordance with a non-limiting example of the present invention, an adaptive modulation communications system incorporates the blind in-service noise estimator described above, and includes a "signal" power estimator, and a link resource allocator. In this system, the channel is typically scalar (i.e. non-array based) for multi-signal and multi-user applications. The system and method, in accordance with a non-limiting example of the present invention, applies signal and noise estimates to select waveforms to maximally use the available channel capacity and adapt to changing channel conditions.

Figure 6:
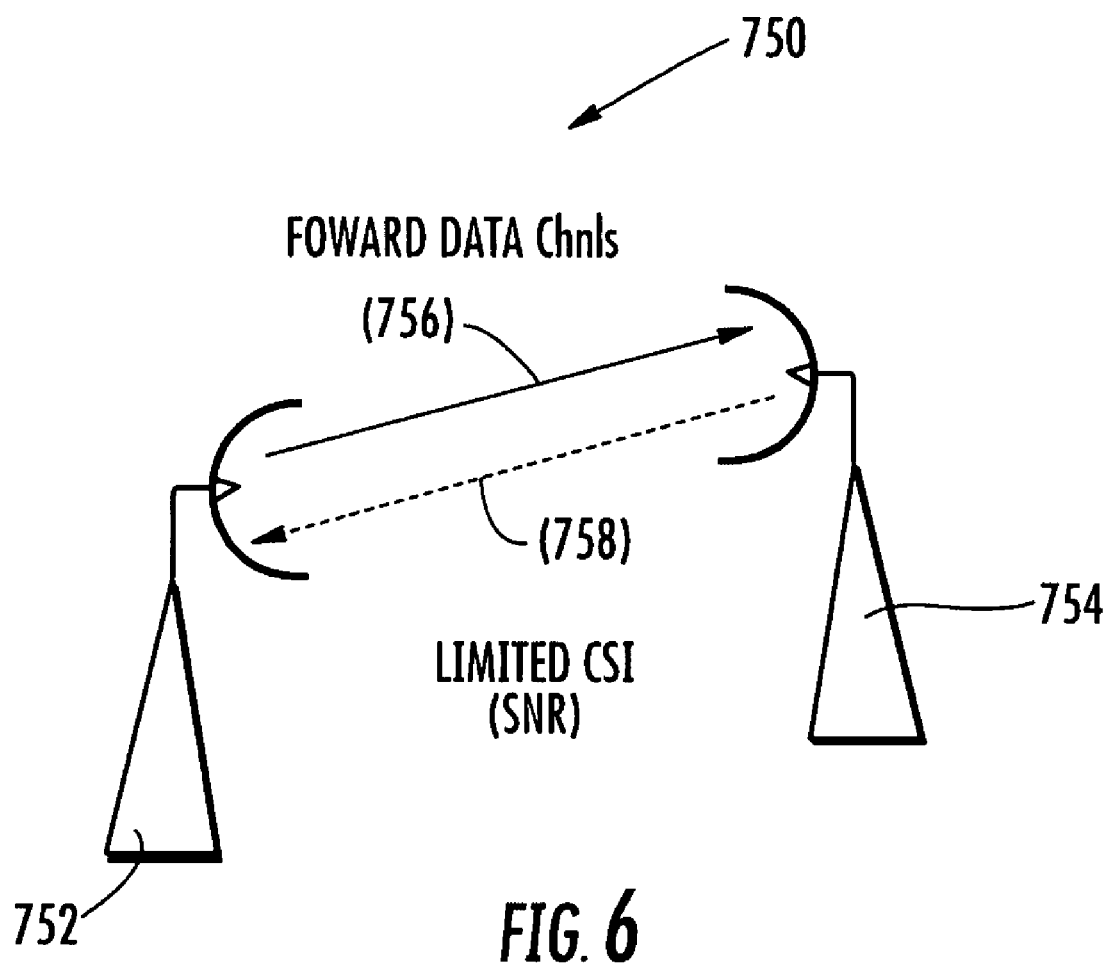
FIG. 6 is another diagrammatic view of a communications system similar to that shown in FIG. 2, but illustrating how a transmitter requires channel status (state) information (CSI), for example, the signal-to-noise ratio (Eb/No), and making "optimum" use of the channel and selecting the coding rate, coding scheme, symbol rate and/or modulation format using the noise level estimator as shown in FIG. 3 in accordance with a non-limiting example of the present invention.

FIG. 6 is a fragmentary, environmental view showing a communications system 750 having two stations as a transmitter 752 and receiver 754 and showing forward data channels 756 and a more limited channel 758 carrying channel status (state) information (CSI) such signal-to-noise ratio (SNR). The transmitter requires the channel status information such as a signal-to-noise ratio, (or Energy per bit (Eb) to Spectral Noise Density (No) (Eb/No), to make "optimum" use of the channel. "Optimum" in this case refers to selecting a modulation method to maximally utilize a channel (i.e., achieving the best error-free spectral efficiency). In notional terms this means that when possible, select the highest-order modulation format consistent with achieving a desired bit error rate (BER). More specifically, with SNR CSI knowledge at the transmitter an adaptive modulation scheme selecting all aspects of a communication stream, in a non-limiting example, such as the coding rate (e.g., ½, ¾, etc.), the coding scheme (e.g., convolutional, block, concatenated, turbo), the symbol rate, the modulation format (e.g., BPSK, QPSK, QAM, FSK, etc.) and other factors for an adaptive system.

It should be understood that modern communications links may have a time-varying mixture of signals and that the mixture may vary over time due to the varying loads offered to a network by one or more data sources in a shared media access scheme (e.g., FDMA, TDMA, CMDA, etc.). In reaction to the changing loads the characteristics of waveform(s) (e.g., symbol rate, modulation type, etc.) occupying the channel may change as in the bandwidth-on-demand (BOD) or demand assignment multiple access (DAMA) systems. Hence, given that anyone of a number of waveforms might be received at any given time the link quality metric (i.e., the SNR CSI) should not rely on synchronization (e.g., timing and carrier recovery) at the receiver nor rely on the explicit knowledge of the signal types on the link. This would incur likely excessive performance penalties in terms of size, weight and power for maintaining multiple instances of hardware circuits or for being reprogrammable. Hence is it very desirable to derive the SNR CSI asynchronously across a number of waveform types.

Further, it is desirable to avoid expending channel resources to obtain a quality metric, which could be based on the noise level at the receiver. For example, some systems may send a training sequence, but in the system as explained in accordance with a non-limiting example of the present invention, there is no necessity to send a training sequence or pilot signals. A benefit of the proposed approach is that if the capacity of the channel is known or can be reliably estimated (e.g., from a measurement of SNR) for measurements derived from the information bearing signal, then the adaptive modulation system can react when necessary to "optimize" links resources (e.g., channel bandwidth, power, etc.) usage.

For example, without SNR CSI a communications system could default to use a rate one-half (½) code. A rate ½ code is constructed such that for every information source bit there are two channel bits, one for information and one for error correction. The error correction bit would generate no revenue from a paying customer. The code bits are used as "redundant" data to correct the occasional errors due to noise in the channel. But, if SNR CSI is available, perhaps there is enough SNR, the code rate could be changed to a rate ⅞, In this case 7 information bits are transmitted with a single error correction code bit. Given the same symbol rate as above, the communication service provider can generate more revenue since the link is utilized for information a higher percentage of the time. Thus, in one aspect of the invention more revenue for a service provider can be obtained by developing a SNR CSI metric for the channel and permitting the coding scheme at the transmitter to change as conditions warrant a change. Consistent with the above non-limiting example are options of changing the modulation or symbol rate or any other parameter desired to be controlled by the system designer to react to detected changes in the CSI. Of course the receiver must be knowledgeable of any changes made the transmitter, so proper decoding can take place. Many prior art communication links use forward and reverse control channels for exchanging this type of data.

Figure 7:
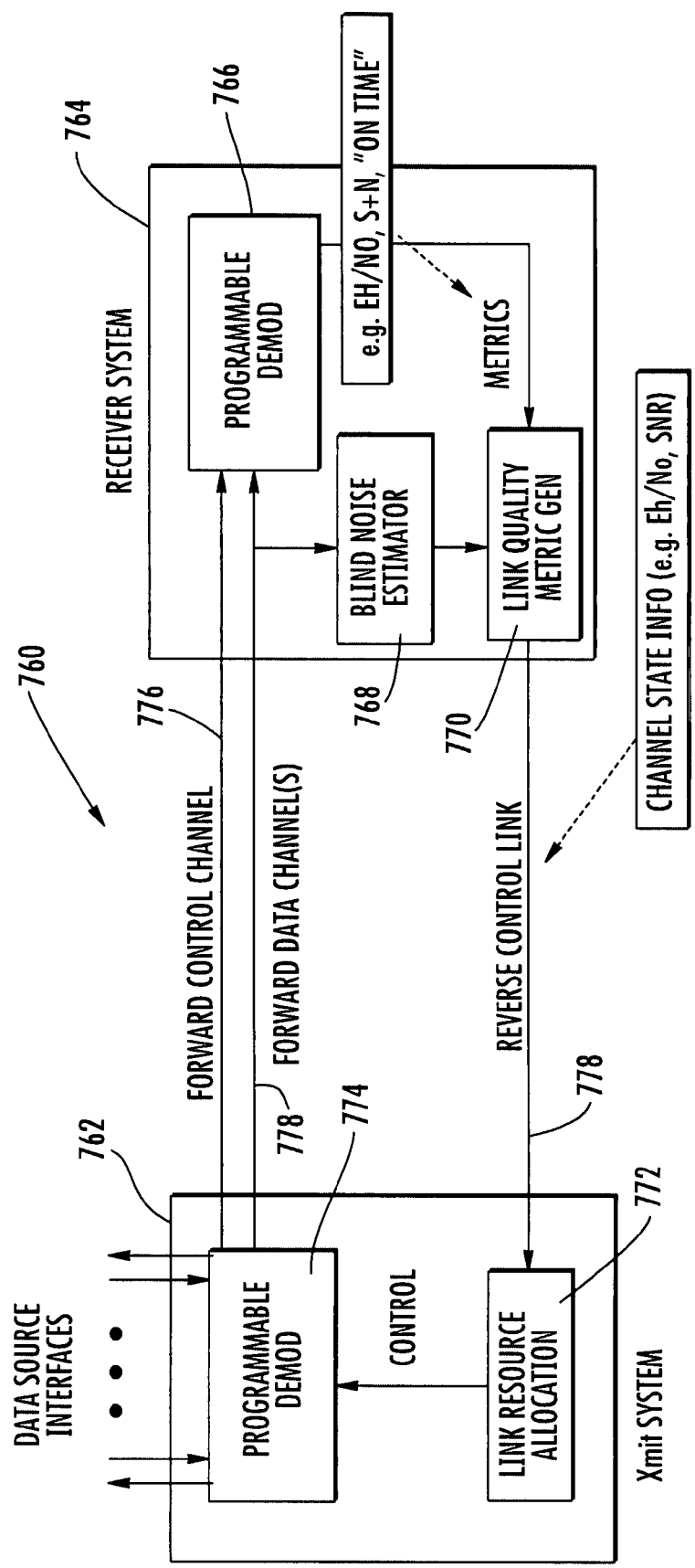
FIG. 7 is a block diagram of a communications system in accordance with a non-limiting example of the present invention and showing a receiver having the blind noise estimator and a link quality metric generator that operates with a reverse control link for passing channel state information (CSI) to a link resource allocator at the transmitter.

FIG. 7 is a block diagram showing basic components in a communications system 760 in accordance with a non-limiting example of the present invention, and showing a transmitter 762 and receiver 764. The receiver 764 includes a programmable demodulator 766 and a blind noise estimator 768 as explained above and a link quality metric generator 770, which communicates with a link resource allocator 772 in the transmitter 762. The link resource allocator 772 communicates with a programmable demodulator 774. The demodulator 766 in the receiver 764 provides signal metrics based on analysis of received signals. For example, a simple total energy (or total average power) measurement of the incoming signal can be made. The term total implies that the signal+noise (S+N) signal is used. This can be easily accomplished with an integrator circuit over some period of time. The advantage of an integrator approach is that symbol synchronization is not needed. However, if timing is derived then other metrics well known to those skilled in the art could also be used. One further factor bears mention. That is that autocorrelation function of any modulation chosen for the communication signal must be relatively broad relative to the digitizer sample rate in the receiver 764 (e.g., 10 times). This relieves many timing related issues, removes synchronization requirements, and can allow multi-carrier operation as well.

But returning to the non-limiting example assuming no timing is available, the link quality metric generator 770 could taking say the ratio of the total energy (or power) from 766 denoted as S+N, and the noise power denoted as N from 768, and form the ratio can be formed. This leads to an SNR metric of (S+N)/N and the "bias" of the noise power in the total can be corrected for by explicitly computing (S+N)/N−1=S/N. As is well known in communication theory when the noise bandwidth is taken as equal to symbol rate S/N=Eb/No, and Eb/No is the metric used to predict symbol error rate for a given modulation format. This in turn impacts, for example, the error correction coding scheme selected so that information transfer on the forward data channel 778 will be completed in the designer's allotted time with a desired overall maximum error rate.

In another non-limiting example, if the modulation waveform is known at the receiver, one can design a matched filter detector and hence directly receive a metric of Eb/No from 766. A measure of noise power N (possibly normalized to bandwidth to yield No) is available from 768 with or without explicit waveform knowledge. Thus, the link CSI for SNR can be diagnosed as to whether the link has faded (i.e., decreased received energy $E_b$) or become more noisy (i.e. increased No) or some of each, and appropriate measures to continue optimal link usage can be taken in these separate circumstances.

Continuing with the system operation, the link resource allocator receives CSI over a reverse control link 780 from the link quality metric generator 770 and monitors the link quality per operational band on the forward data channels 778, for example, the signal-to-noise ratio (SNR). The resource allocation unit 772 can allocate a bit-rate/source by "policy," for example, ATM or a maximized user experience, such as, with wireless IP networks. Besides data rate, the link resource allocator 772 may also choose to allocate power per user or some other limited resource in addition to typical implementation choices for a communication system. For example, the link resource allocator 772 certainly selects at the transmitter 762 the modulation and coding scheme to reliably transmit the required data in the amount required in the allotted time.

As a non-limiting example, the link resource allocator 772 could select one of the M-ary phase shift keying (PSK) modulation schemes available in a programmable DEMOD 774 based on measured temporal variations in the signal-to-noise ratio such that as SNR increases the modulation order (M) is increased. The advantage is reducing the time to transmit the information form the source to the destination, thus freeing the link to potentially handle more users than if fixed schemes were employed. The benefit to the service provider is again increase utilization of link to generate revenue.

Depending on the particular implementation and trade-offs (e.g., implementation costs versus operational benefits) involved we can conceive that modulation variations on a time slot basis and synchronized with individual users, for example could be of benefit.

As will be appreciated by those skilled in the art, there are many possible trades and combinations to consider for a particular application and the above discussion only highlights some non-limiting examples.

The blind noise estimator 768 is typically operative such that there is a separation between the data channel 778 and the forward control channel 776. The separation can be physical (e.g., wires, frequency) or logical. The data link, as shown, can be simplex for the data while the control would typically could simplex, half duplex, or full duplex. While FIG. 10 only illustrates simplex data transmission, this is a non-limiting example and more complex communication systems (e.g., half duplex/full duplex, symmetric/asymmetric transfer and any number of nodes) can be constructed from this "prototype" skeleton example.

Figure 8:
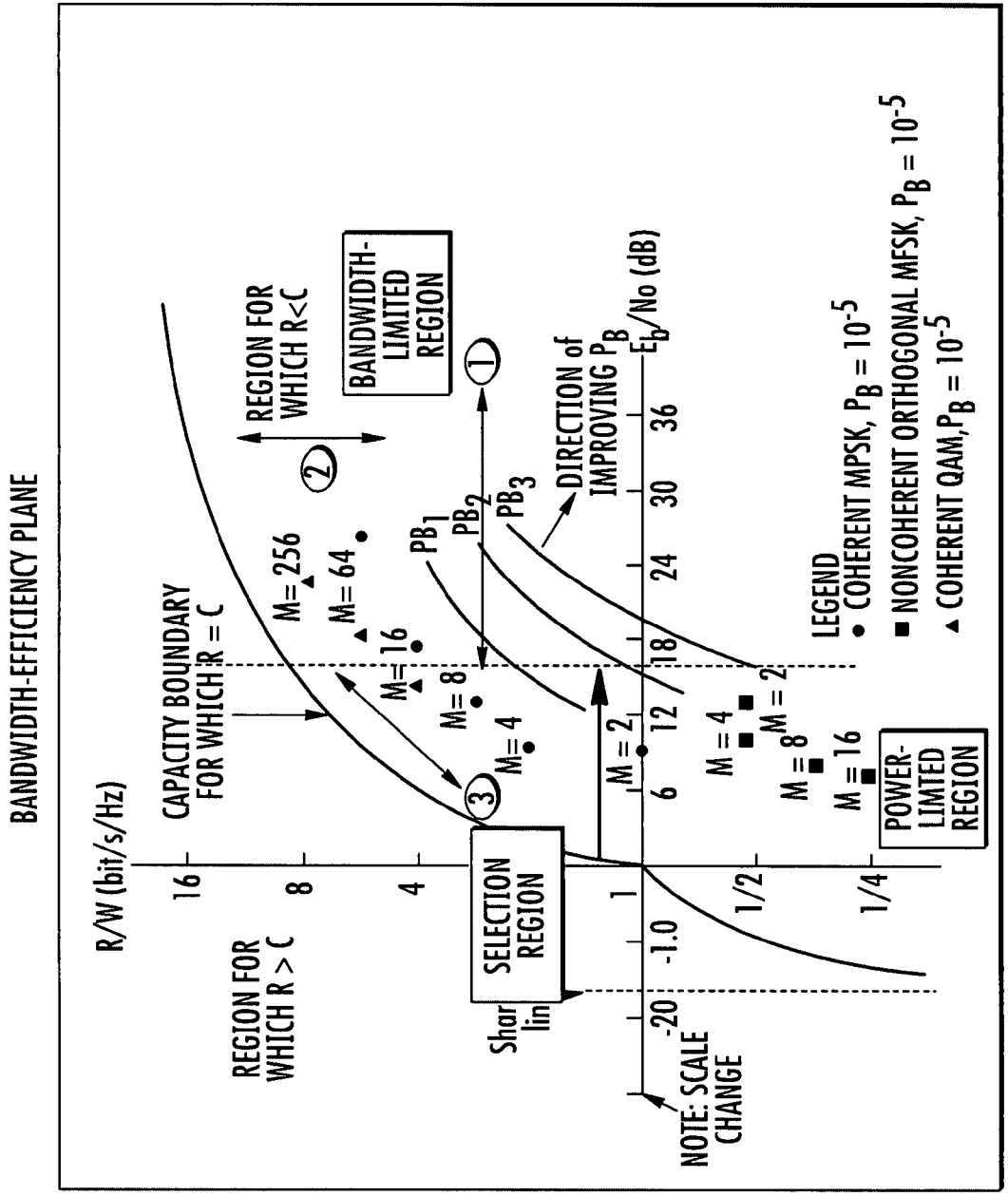
FIG. 8 is a graph showing a bandwidth-efficiency plane and showing a selection region as a non-limiting example of the present invention.

FIG. 8 is a graph showing a well-known representation of the bandwidth-efficiency plane in accordance with a non-limiting example of the present invention and showing a selection region. For example, if a "16 dB" signal-to-noise ratio (i.e., Eb/No) occurs, then any modulation format can be selected between the solid and dashed curves (i.e., the selection region). Using this example, say the M=4 is selected, then the link would access the communication media as QPSK. If the M=16 point was selected then 16-ary QAM would be used. The advantage of selecting QAM is higher raw (i.e., uncoded) spectral efficiency in terms of bits/sec/Hertz. However, what is not fully indicated are parametric curves for bit error rate. The trend is that error rate increases as one moves from lower right to upper left, hence the added overhead of error correction coding must be accounted for in the link resource allocator 772 (FIG. 7) when desiring to use higher-order (aka spectrally efficient) modulations. The overhead of coding can be straight-forwardly computed in instances of practical importance using resources well known to those skilled in the art.

We can extend to the current concept to multiple carrier waveforms. In this case this receiver knows to expect say p carriers from the transmitter based on handshaking on the control channels. In this case there are algorithmic advantages such that the system can operate on single-carrier and multi-carrier (p) signals without modifying any techniques. "p" can be varying and could be for example 1, 2, 3 or 4 (or higher). When p is known at the receiver, then the "margin" M can be set as M=0. If, however, to conserve control link bandwidth the value of p is unknown to the receiver then previously disclosed limitation of p+M+v must be observed. In any event, the system is waveform agnostic and independent of the specific waveform or waveform class and timing.

The system as presented in this disclosure is time-adaptive and has a varying p (p>=1) and waveform mix without requiring the expenditure of link resources (e.g., no pilot tones, no training, etc.). The system provides an ability to select a waveform to maximize the link utilization with respect to the Shannon capacity as shown in the graph of FIG. 8. The system is insensitive to the choice of system antenna aperture to the extent that an array is not required even when there are multiple signals in the link. The antenna could be a single element for a wireless system, or equivalently for a wired system the transmission medium could be a fiber, for example. Hence, the system is equally applicable to wireless or wire-line systems. In either scenario, the noise estimate can be achievable in time co-incident, multi-carrier (multi-signal) systems without an array. As a result, multiple signals can be treated as one "signal" and a number of dimensions reserved that are available for noise only. The system does not have to separate those signals because the demodulator can later accomplish that task.

In the multi-carrier implementation and operation, there is an inclusion of minimal "margin" M (or guard) based on enabling operation in multipath environments such as a large delay spread indoor or urban environments. The dimensions of the covariance matrix (Rxx) address the separation of noise-only eigenvalues and limits computation. "M" must be selected large enough to provide isolation of the signal and multi-path components from the noise only dimensions.

Again, by using an adaptive data buffer size for the sampled signals (N), the system can support various adaptation rates which is an advantage on adaptive modulation system.

This application is related to copending patent applications entitled, "SYSTEM AND METHOD FOR ESTIMATING NOISE POWER LEVEL IN A MULTI-SIGNAL COMMUNICATIONS CHANNEL," which is filed on the same date and by the same assignee and inventors, the disclosure, which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
   a transmitter that transmits a modulated signal having encoded communications data over a communications channel, and comprising link resource allocator that adjusts one of at least modulation and coding at the transmitter based on received channel state information of the transmitted signal;
   a receiver that receives the transmitted signal, and comprising a
   demodulator that determines received signal metrics from the modulated signal;
   a noise power estimator that estimates the noise power of the received communications signal by collecting N data samples from the communications signals, forming a covariance matrix of the N data samples based on a model order estimate, computing the eigenvalue decomposition of the covariance matrix and ranking resultant eigenvalues from the minimum to the maximum for determining the noise power of the received signal; and
   a link quality generator that determines the link quality of the communications channel and generates channel state information based on the estimated noise power and received signal metrics and transmits the channel state information to said link resource allocator within said transmitter, wherein at least one of modulation and coding are adjusted based on monitored link quality of the communications channel to enhance use of the available channel capacity.

2. The communications system according to claim 1, wherein the signal metrics comprise the signal-to-noise ratio.

3. The communications system according to claim 1, wherein said communications channel comprises a scalar, multi-signal communications channel.

4. The communications system according to claim 1, wherein said noise power estimator is operative for estimating the model order based on a number to over bound a maximum possible number of possible individual signals from the transmitter.

5. The communications system according to claim 1, wherein said noise power estimator is operative for estimating the model order based on one of at least a Multiple Signal Classifier, Pisarenko Harmonic Decomposition, Auto-regression, Pade Approximation, Bayesian Information Criterion, Akaike's Information Criterion and Minimum Description Length algorithm.

6. The communications system according to claim 1, wherein said noise power estimator is operative with a block adaptation size based on an estimated margin, noise dimension and expected signal-to-noise ratio used for averaging the smallest eigenvalue.

7. The communications system according to claim 1, wherein said communications channel between said transmitter and receiver comprises a control channel and data channel, wherein link quality of the communications channel is monitored at the receiver based on the data channel.

8. The communications system according to claim 1, wherein said link resource allocator is operable for allocating bit rate/source by policy.

9. A receiver comprising:
   a signal input for receiving a modulated signal having encoded communications data that has been transmitted over a communications channel;
   a demodulator that determines received signal metrics from the modulated signal;
   a noise power estimator that estimates the noise power of the received communications signal by collecting N data samples from the communications signals, forming a covariance matrix of the N data samples based on a model order estimate, computing the eigenvalue decomposition of the covariance matrix and ranking resultant eigenvalues from the minimum to the maximum for determining the noise power of the received signal; and
   a link quality generator operative with the demodulator and noise power estimator that determines the link quality of the communications channel and generates channel state information based on the estimated noise power and received signal metrics and transmits the channel state information to a transmitter where at least one of modulation and coding are adjusted based on monitored link quality of the communications channel to enhance use of the available channel capacity.

10. The receiver according to claim 9, wherein the signal metrics comprise the signal-to-noise ratio.

11. The receiver according to claim 9, wherein said communications channel comprises a scalar, multi-signal communications channel.

12. The receiver according to claim 9, wherein said noise power estimator is operative for estimating model order based on a number to over bound a maximum possible number of possible individual signals from the transmitter.

13. The receiver according to claim 9, wherein said noise power estimator is operative for estimating the model order based on one of at least a Multiple Signal Classifier, Pisarenko Harmonic Decomposition, Auto-regression, Pade Approximation, Bayesian Information Criterion, Akaike's Information Criterion and Minimum Description Length algorithm.

14. The receiver according to claim 9, wherein said noise power estimator is operative with a block adaptation size based on an estimated margin, noise dimension and expected signal-to-noise ratio used for averaging the smallest eigenvalue.

15. The receiver according to claim 9, wherein said modulated signal comprises data and synchronization pulses and said receiver comprises a first filter matched to a synchronization pulse, a second filter inversely matched to the synchronization pulse, a detector that determines the synchronization pulse based on outputs from the first and second filters, wherein said noise power estimator is coupled to the detector and estimates the noise power and sets a noise threshold based on the input signal using a covariance matrix that is formed of the N data samples based on the model order estimate.

16. A method of communicating, comprising:
   transmitting from a transmitter a modulated signal having encoded communications data over a communications channel;
   receiving the modulated signal within a receiver;
   demodulating the received signal while determining the received signal metrics from the modulated signal;
   estimating the noise power of the received communications signal by collecting N data samples from the communications signals, forming a covariance matrix of the N data samples based on a model order estimate, computing the eigenvalue decomposition of the covariance matrix and ranking resultant eigenvalues from the minimum to the maximum for determining the noise power of the received signal;

determining the link quality of the communications channel and generating channel state information based on the estimated noise power and received signal metrics;

transmitting the channel state information to the transmitter adjusting at least one of the coding and modulating based on monitored link quality of the communications channel to enhance use of the available channel capacity.

17. The method according to claim 16, wherein the signal metrics comprise the signal-to-noise ratio.

18. The method according to claim 16, wherein the communications channel comprises a scalar, multi-signal communications channel.

* * * * *